United States Patent
Yoon et al.

(10) Patent No.: US 11,930,128 B2
(45) Date of Patent: Mar. 12, 2024

(54) DUAL CAMERA MODULE, ELECTRONIC APPARATUS INCLUDING THE SAME, AND METHOD OF OPERATING ELECTRONIC APPARATUS

(71) Applicant: SAMSUNG ELECTRONICS CO., LTD., Suwon-si (KR)

(72) Inventors: Youngzoon Yoon, Hwaseong-si (KR); Hyuck Choo, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 566 days.

(21) Appl. No.: 16/950,377

(22) Filed: Nov. 17, 2020

(65) Prior Publication Data
US 2021/0152681 A1 May 20, 2021

(30) Foreign Application Priority Data
Nov. 19, 2019 (KR) .......................... 10-2019-0148795

(51) Int. Cl.
*H04N 23/55* (2023.01)
*F21V 9/14* (2006.01)
*H04M 1/02* (2006.01)
*H04N 23/54* (2023.01)

(52) U.S. Cl.
CPC ............ *H04M 1/0264* (2013.01); *F21V 9/14* (2013.01); *H04N 23/54* (2023.01); *H04N 23/55* (2023.01); *H04M 2250/52* (2013.01)

(58) Field of Classification Search
CPC ... H04M 1/0264; H04M 2250/52; F21V 9/14; H04N 23/54; H04N 23/55; H04N 23/56; H04N 23/57; G01J 3/02
See application file for complete search history.

(56) References Cited

U.S. PATENT DOCUMENTS

| 10,545,050 | B2 | 1/2020 | Yoon et al. |
| 2005/0148842 | A1 | 7/2005 | Wang et al. |
| 2010/0208262 | A1* | 8/2010 | Yoshida ................. G01J 3/021 |
| | | | 356/326 |
| 2014/0085502 | A1 | 3/2014 | Lin et al. |
| 2014/0333802 | A1 | 11/2014 | Arai |
| 2015/0086117 | A1 | 3/2015 | Comstock, II et al. |
| 2016/0187199 | A1 | 6/2016 | Brunk et al. |

(Continued)

FOREIGN PATENT DOCUMENTS

| CA | 2509590 A1 * | 12/2006 | ......... A61B 1/00048 |
| JP | 2019095445 A | 6/2019 | |

OTHER PUBLICATIONS

Lee, J., et al., "A microscale optical implant for continuous in vivo monitoring of intraocular pressure", Microsystems & Nanoengineering, 2017, vol. 3, No. 17057, pp. 1-9.

*Primary Examiner* — Donald L Raleigh
(74) *Attorney, Agent, or Firm* — Sughrue Mion, PLLC

(57) ABSTRACT

There is provided a dual camera apparatus, an electronic apparatus including the same, and a method of operating the same are disclosed. The dual camera apparatus includes a first camera that acquires an entire image of a subject; and a second camera different than the first camera. The second camera includes a first light source, an optical element concentrates light emitted from the first light source onto a portion of a region of the subject and an image sensor that records spectrum information with respect to the portion of the region of the subject.

20 Claims, 10 Drawing Sheets

(56) References Cited

U.S. PATENT DOCUMENTS

| | | |
|---|---|---|
| 2017/0215727 A1 | 8/2017 | Chuck et al. |
| 2017/0280970 A1* | 10/2017 | Sartor .................... H04N 23/56 |
| 2019/0101444 A1 | 4/2019 | Yoon et al. |
| 2019/0154503 A1 | 5/2019 | Yoon et al. |
| 2020/0116567 A1 | 4/2020 | Yoon et al. |
| 2021/0176412 A1 | 6/2021 | Yoon et al. |

* cited by examiner

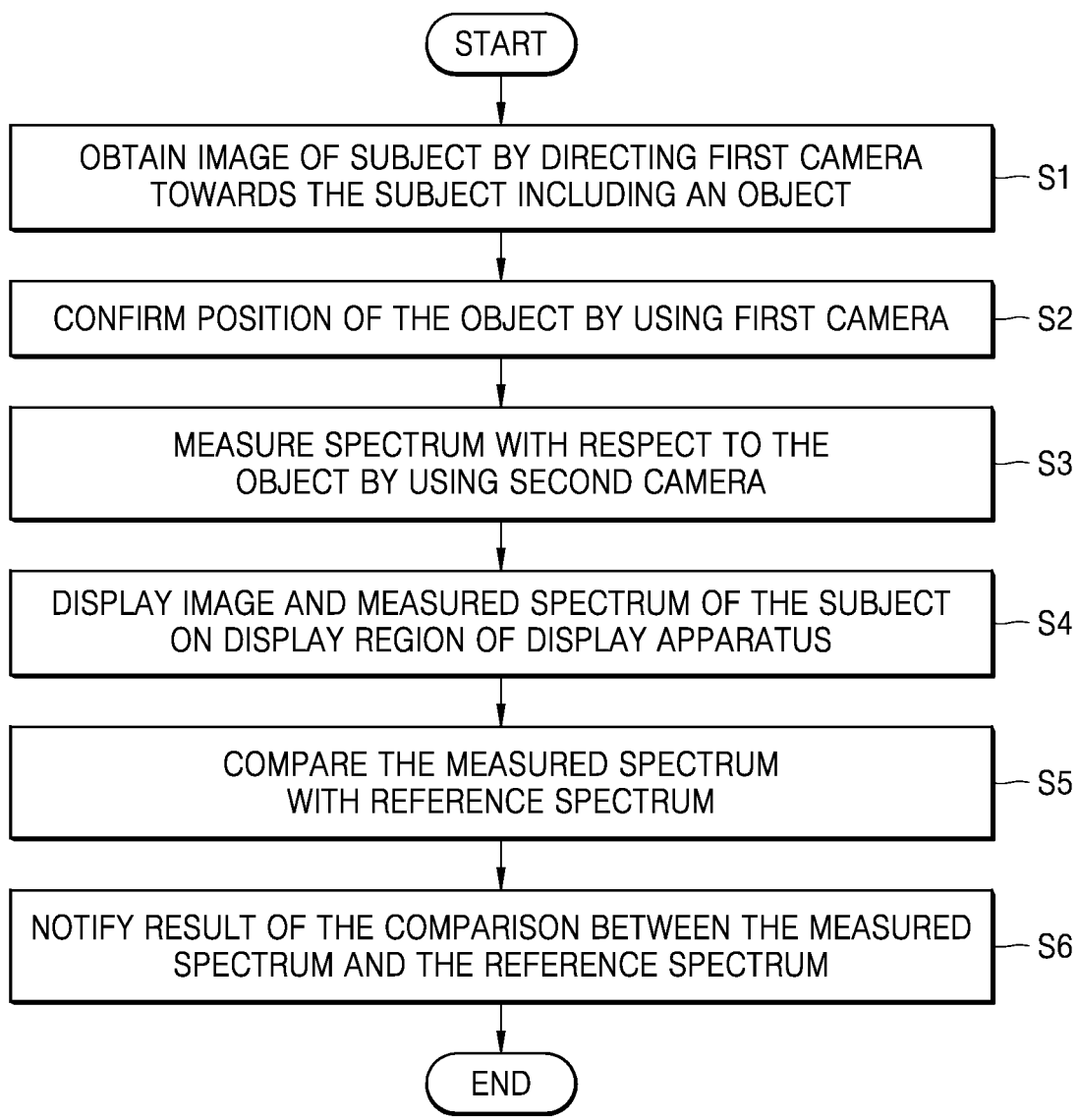

DUAL CAMERA MODULE, ELECTRONIC APPARATUS INCLUDING THE SAME, AND METHOD OF OPERATING ELECTRONIC APPARATUS

CROSS-REFERENCE TO RELATED APPLICATION

This application is based on and claims priority from Korean Patent Application No. 10-2019-0148795, filed on Nov. 19, 2019, in the Korean Intellectual Property Office, the disclosure of which is incorporated herein in its entirety by reference.

BACKGROUND

1. Field

The disclosure relates to camera apparatuses and the application thereof, and more particularly, to dual camera apparatuses, electronic apparatuses including the same, and methods of operating the electronic apparatuses.

2. Description of Related Art

In a spectrometer inspector in which a light source of an on-axis for an eye sensor is aligned, since a measurement may be performed in a state that the light source and a measuring device are aligned, the eye sensor may have a high measurement accuracy but is difficult to miniaturize. A scanning method using hyperspectral is embodied by combining scanning equipment with a spectroscopic image sensor and is a method of simultaneously obtaining an image and a spectrum by exchanging a slit-type spectrum or a front filter. A non-scanning snapshot method using hyperspectral also is a method of measuring by including different filters directly on image pixels.

SUMMARY

Provided are dual camera apparatuses that may simultaneously acquire an image and spectrum information of an object together with the miniaturization of an electronic apparatus.

Provided are electronic apparatuses capable of simultaneously displaying images and spectrum information acquired through a dual apparatus.

Provided are method of operating the electronic apparatuses.

Additional aspects will be set forth in part in the description which follows and, in part, will be apparent from the description, or may be learned by practice of the presented embodiments of the disclosure.

According to an aspect of the disclosure, there is provided a dual camera apparatus comprising: a first camera configured to acquire an entire image of a subject; and a second camera different than the first camera, wherein the second camera comprises: a first light source; an optical element configured to concentrate light emitted from the first light source onto a portion of a region of the subject; and an image sensor configured to record spectrum information with respect to the portion of the region of the subject.

The second camera may comprise a case in which the light source and the optical element are built-in.

A second light source may be provided outside the first and second camera.

The second camera may comprise a camera element configured to measure a spectrum with respect to the portion of the region of the subject.

The optical element may comprise a lens and light guide module configured to radiate concentrated light emitted from the first light source to the portion of the region of the subject and transferring light reflected from the portion of the region of the subject to the image sensor.

The lens and light guide module may comprise: a beam splitter on-axially disposed with the first light source; a first optical unit disposed between the first light source and one surface of the beam splitter to supply linearly polarized light to the beam splitter; a second optical unit that is disposed in a direction of emitting the linearly polarized light supplied to the beam splitter from the beam splitter to give a change to the linearly polarized light, and comprises a configuration by which the linearly polarized light that has received a change is concentrated on the portion of the region of the subject; a spectrum filter disposed between the beam splitter and the image sensor; and a low pass filter disposed between the beam splitter and the spectrum filter.

The first optical unit may comprise: a pinhole disposed between the first light source and the beam splitter; a collimation lens disposed between the pinhole and the first light source; and a linear polarizer disposed between the pinhole and the beam splitter.

The second optical unit may comprise: a phase delay plate for changing a polarization direction of the linearly polarized light emitted from the beam splitter; and a second lens for concentrating light incident through the phase delay plate to the portion of the region of the subject.

The spectrum filter may comprise a plurality of filter regions, wherein each of the plurality of filter regions comprises a layer structure that transmits light of different wavelengths from each other.

According to another aspect of the disclosure, there is provided a dual camera apparatus comprising: a first camera provided to acquire a whole image of a subject; a second camera provided to acquire a spectral image of a portion of a region of the subject; and a light source module configured to emit concentrated light on the portion of the region of the subject, wherein the light source module is disposed around the first camera and second camera, wherein the light source element comprises: a light source; a collimation lens configured to convert light emitted from the light source into parallel light; a pinhole configured to remove unnecessary light from the light passing through the collimation lens; and a lens configured to concentrate light passing through the pinhole on the portion of the region of the subject.

The light source module may be disposed between the first camera and the second camera.

According to another aspect of the disclosure, there is provided an electronic apparatus comprising: the dual camera apparatus; a display region in which a plurality of pieces of information transmitted from the dual camera apparatus are simultaneously displayed; a circuit configured to drive and control the electronic apparatus; and a battery.

The plurality of pieces of information may comprise an image of a subject and spectrum information about a portion of a region of the subject.

According to another aspect of the disclosure, there is provided a method of operating an electronic apparatus including a dual camera apparatus, the method comprising: acquiring an image of a subject using a first camera; and acquiring a spectrum of a portion of a region of the subject by using a second camera, the second camera being different than the first camera, wherein the acquiring of the spectrum comprises: irradiating light to the portion of the region of the subject by using an exclusive light source built in the second camera; and simultaneously displaying the acquired image and the spectrum, wherein the dual camera apparatus includes the first and second cameras.

The method may further comprise comparing the acquired spectrum with a reference spectrum.

The method may further comprise notifying a person who is concerned of the comparison result obtained in the comparing operation.

The acquiring of the spectrum may comprise: confirming the portion of the region of the subject with the first camera; converting light emitted from the exclusive light source into polarized light; irradiating the polarized light to the portion of the region of the subject by concentrating the polarized light; changing a polarization state of light reflected by the portion of the region of the subject; and recording the light, the polarization state of which is changed, into an image sensor by dividing the light by wavelengths.

The portion of the region of the subject may be a partial region of an intraocular pressure sensor implanted in a human eye or a partial region of a contact lens attached to a human eye.

According to another aspect of the disclosure, there is provided an electronic apparatus comprising: the dual camera apparatus; a display region in which a plurality of pieces of information transmitted from the dual camera apparatus are simultaneously displayed; a circuit configured to drive and control the electronic apparatus; and a battery.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10 is a flowchart of a method of operating an electronic apparatus including a dual camera apparatus according to an embodiment.

DETAILED DESCRIPTION

Figure 1:
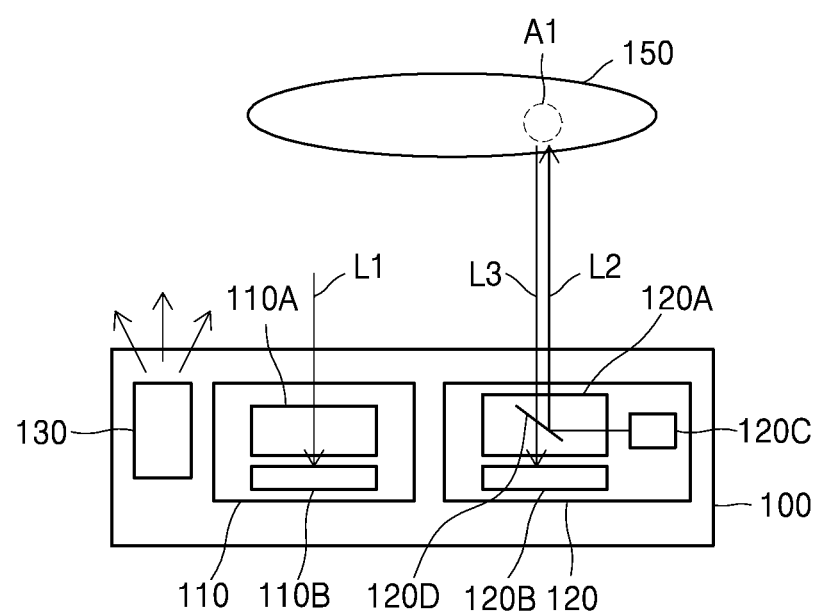
FIG. 1 is a cross-sectional view of a first dual camera apparatus according to an example embodiment.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, a dual camera apparatus, an electronic apparatus including the same, and a method of operating the electronic apparatus according to an embodiment will be described in detail with reference to the accompanying drawings. In the drawings, thicknesses of layers or regions may be exaggerated for clarity of the specification. The embodiments of the inventive concept are capable of various modifications and may be embodied in many different forms. in the layer structure described below, when an element or layer is referred to as being "on" or "above" another element or layer, the element or layer may be directly on another element or layer or intervening elements or layers.

FIG. 1 is a cross-sectional view of a first dual camera apparatus 100 according to an embodiment.

Referring to FIG. 1, the first dual camera apparatus 100 includes two different types of cameras, that is, first and second camera cameras 110 and 120 and a first light source 130. Configurations and uses of the first and second camera cameras 110 and 120 may be different from each other.

The first camera 110 may be a visible light camera for acquiring an RGB image of a subject 150. The first camera 110 may be a general camera. For example, the first camera 110 may be an image photographing camera mounted on a small mobile device, such as a mobile phone. The first camera 110 includes a first image sensor 110B and a first optical guide module 110A including a lens that receives first incident light L1 and allows the first incident light L1 to reach the first image sensor 110B. The first optical guide module 110A may be disposed in front of a surface of the first image sensor 110B on which the first incident light L1 is incident. The first incident light L1 is incident to the first image sensor 110B through the first optical guide module 110A. The first optical guide module 110A is positioned between the subject 150 and the first image sensor 110B. The first optical guide module 110A may include a single lens or two or more lenses on an optical axis. The first image sensor 110B may be, for example, a complementary metal-oxide-semiconductor (CMOS) image sensor, but is not limited thereto. The first light source 130 may emit light for the first camera 110. For example, the first light source 130 may be a light source providing a sufficient amount of light or a minimum amount of light necessary for photographing an image of the subject 150 in an environment when an illumination is not enough to photograph an image of the subject 150 using the first camera 110. Regardless of the use of the first dual camera apparatus 100, the first light source 130 may be used as a general lighting source by being connected to a power source of a device on which the first dual camera apparatus 100 is mounted.

The second camera 120 may be a camera having a different use from that of the first camera 110. For example, the second camera 120 may be a spectroscopic camera that measures a spectrum with spectrum information. The second camera 120 may be a camera for measuring a spectrum of a first area A1 of the subject 150. The second camera 120 may include a second optical guide element 120A including a lens, a second image sensor 120B, and a second light source 120C.

The configuration of the second optical guide element 120A may be different from configuration of the first optical guide element 110A. The second optical guide element 120A may include a beam splitter 120D. The second optical guide element 120A may include a plurality of members, such as a spectrum filter in addition to the beam splitter 120D, which will be described below. The beam splitter 120D may be, for example, a polarized beam splitter (PBS) that reflects or transmits light according to the polarization state of light. The beam splitter 120D and the second light source 120C may be disposed to face each other. Accordingly, light L2 emitted from the second light source 120C toward the beam splitter 120D is reflected toward the subject 150 at the beam splitter 120D. The subject 150 may be an object disposed in a local area, and the first area A1 may be a specific area belonging to the object. For example, the object may be a contact lens or a type of a sensor (for example, an intraocular pressure sensor) inserted into a human eye, and the first area A1 may be a partial region of the contact lens or a partial region of the intraocular pressure sensor. The subject 150 may be a portion of a human skin or a portion of a surface of an object, and at this point, the first area A1 may be an area of a part of the skin which is a spectral measurement target and on which an unidentified substance is stained or a part of the surface of the object which is a spectral measurement target and on which an unidentified substance is stained.

Next, the light L2 reflected by the beam splitter 120D may be concentrated on a part of the subject 150, for example, the first area A1. An area or volume of the first area A1 is much less than an area or volume of the subject 150. The light L2 emitted from the second light source 120C may be light having high concentration than generally emitted light so that the light L2 reflected by the beam splitter 120D is concentrated in the first area A1 of the subject 150. Accordingly, the divergence or spread of the light L2 emitted from the second light source 120C to the beam splitter 120D may be minimized in a process of reaching the first area A1 of the subject 150. Accordingly, an amount of light L3 that is to be reflected from the first area A1 incident on the second camera 120 also increases, and thus, a clear spectrum with respect to the first area A1 may be measured. The second light source 120C may be a light source that emits broadband light or include the light source. The second light source 120C may be, for example, a light emitting diode (LED) having a broadband wavelength, but is not limited thereto. The second light source 120C and the beam splitter 120D may be on-axially disposed.

The second image sensor 120B is for recording a spectral image. The second image sensor 120B may be a CMOS image sensor. The second optical guide element 120A may be disposed between the first area A1 of the subject 150 and the second image sensor 120B. The second optical guide element 120A and the second image sensor 120B may be arranged in line with the first area A1 to be measured a spectrum. In other words, the beam splitter 120D of the second optical guide element 120A, the second image sensor 120B, and the first area A1 may be aligned in a row. In other words, the beam splitter 120D and the second image sensor 120B may be on-axially disposed.

When the first dual camera apparatus 100 of FIG. 1 is used, the first camera 110 may obtain an entire image of the subject 150, and at the same time, the second camera 120 may obtain a spectrum of the first area A1 of the subject 150.

The first and second cameras 110 and 120 may be operated in real time. Therefore, when the first dual camera apparatus 100 is mounted on a device (for example, a medical display device or a mobile phone) including a communication interface and a display, an image of the subject 150 and spectrum information of the first area A1 may be simultaneously obtained in real time.

Figure 2:
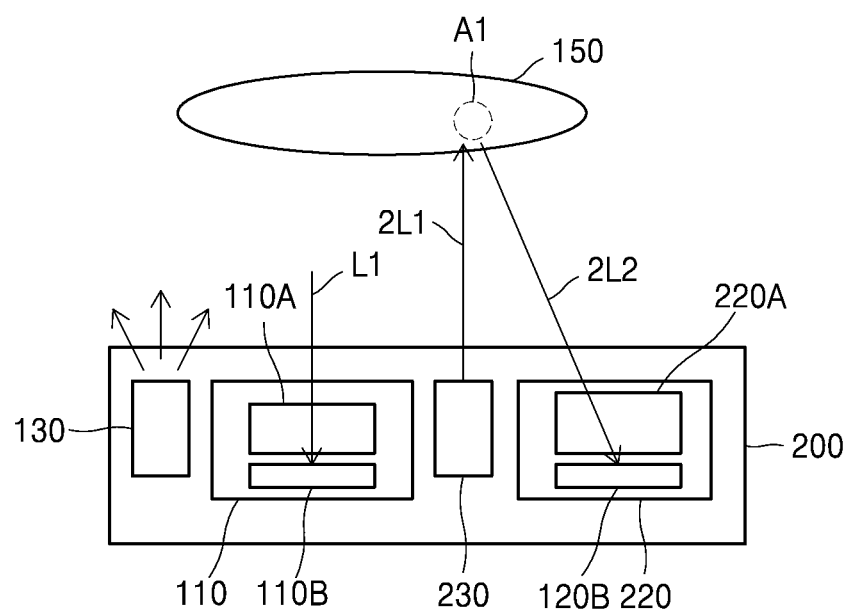
FIG. 2 is a cross-sectional view of a second dual camera apparatus according to another example embodiment.

FIG. 2 is a cross-sectional view of the second dual camera apparatus 200 according to another embodiment. Only parts different from the first dual camera apparatus 100 of FIG. 1 will be described. Like reference numerals as used in the first dual camera apparatus 100 indicate the same elements.

Referring to FIG. 2, the second dual camera apparatus 200 includes first and second camera 110 and 220, a first light source 130, and a light source module 230. The light source module 230 is provided between the first camera 110 and the second camera 220. The light source module 230 may be used as a light source of the second dual camera apparatus 200, which is a spectroscopic camera. The second camera 220 does not include a light source. The light source module 230 may include a light source for emitting broadband light. The light source included in the light source module 230 may be, for example, an LED, but is not limited thereto. The light source module 230 may include a pinhole-like member as an element for removing unnecessary light from light emitted from the light source together with the light source and a collimation lens for converting light emitted from the light source into parallel light. In addition, the light source module 230 may include a lens that allows light irradiated to the first area A1 of the subject 150 to be concentrated in the first area A1. The second camera 220 may include a second light guide module 220A, and a second image sensor 120B. The second camera 220 additionally includes a light source module 230 for the spectroscopic camera, and thus, the second light guide module 220A may not include a polarizer and a beam splitter.

Light 2L1 emitted from the light source module 230 to the first area A1 of the subject 150 is reflected in the first area A1 and is incident on the second camera 220 as light 2L2, and then, is incident on the second image sensor 120B through the second light guide module 220A.

Figure 3:
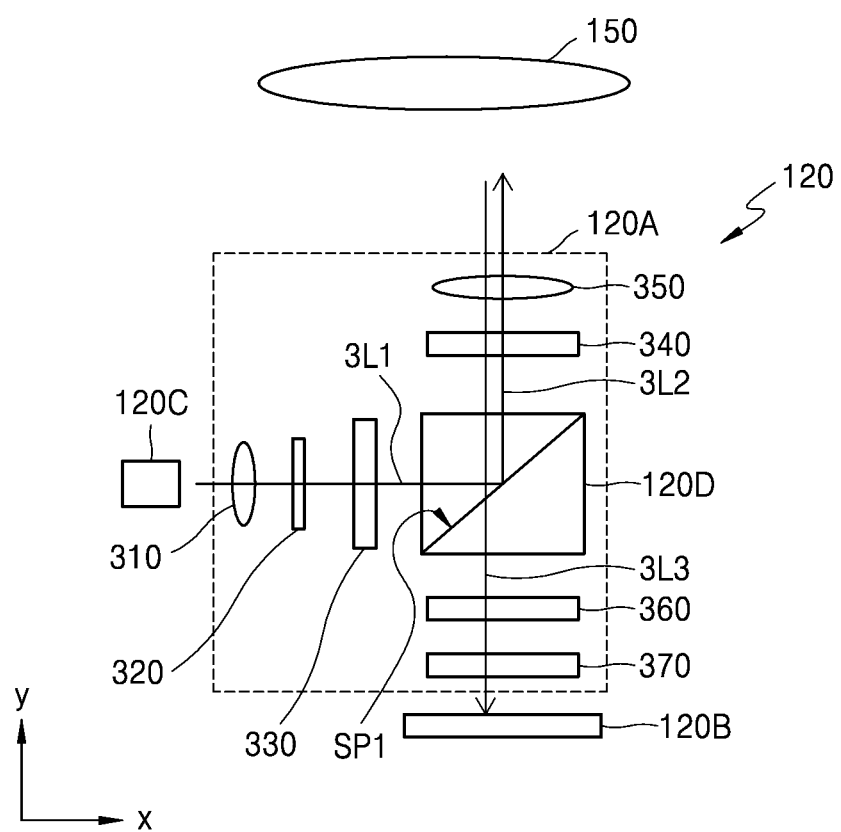
FIG. 3 is a configuration of an example of a second camera included in the first dual camera apparatus of FIG. 1.

FIG. 3 is a configuration of an example of a second camera 120 included in the first dual camera apparatus 100 of FIG. 1.

Referring to FIG. 3, the second light source 120C and the beam splitter 120D are arranged parallel to each other in an X-axis direction. A first lens 310, a pinhole 320, and a first polarizer 330 are sequentially arranged parallel to each other in the X-axis direction between the second light source 120C and the beam splitter 120D. The first polarizer 330 may be a polarizing plate or a polarizing film. The beam splitter 120D includes a light splitting surface SP1. The beam splitter 120D may be formed by attaching two right-angled prisms. At this time, the two right-angled prisms may be attached to each other facing inclined surfaces thereof. The light splitting surface SP1 may be a surface in which the two inclined surfaces of the two right-angled prisms are in contact with each other. The second light source 120C may be located at a focal point of the first lens 310. Accordingly, light emitted from the second light source 120C becomes parallel light by passing through the first lens 310. Accordingly, parallel light is incident on the pinhole 320. As the parallel light passes through the pinhole 320, unnecessary light included in the parallel light may be removed. Light passing through the pinhole 320 is incident on the first polarizer 330. The first polarizer 330 may be a polarizing plate that produces linearly polarized light. Therefore, light passing through the first polarizer 330 becomes linearly polarized light vibrating in a given direction (for example, perpendicular to the paper). As a result, the first lens 310, the pinhole 320, and the first polarizer 330 may be referred to as a first optical unit that generates linearly polarized light. Light 3L1 passing through the first polarizer 330 is reflected as light 3L2 in a Y-axis direction at the light splitting surface SP1 due to its polarization characteristic. The Y-axis direction may coincide with a direction in which the linearly polarized light supplied to the beam splitter 120D is emitted from the beam splitter 120D. A phase delay plate 340 and a second lens 350 are sequentially arranged above the beam splitter 120D in the Y-axis direction. The phase delay plate 340 and the second lens 350 may be referred to as a second optical unit that irradiates collected light to the first area A1 of the subject 150. The phase delay plate 340 as a ¼ wave plate may affect the polarization direction of linearly polarized light received from the beam splitter 120D. The linearly polarized light becomes circularly polarized light while passing through the phase delay plate 340. The beam splitter 120D, the phase delay plate 340, and the second lens 350 are all on the same optical axis. Light 3L2 reflected by the light splitting surface SP1 sequentially passes through the phase delay plate 340 and the second lens 350 and is incident on the subject 150. Concentrated light may be incident on a specific area of the subject 150 by the second lens 350. The light concentrated in the specific region of the subject 150 is reflected as light 3L3 by the specific region and is incident on the beam splitter 120D sequentially through the second lens 350 and the phase delay plate 340. The light incident on the beam splitter 120D through the phase delay plate 340 passes through the light splitting surface SP1 due to the polarization state and is incident on the second image sensor 1206 through a low pass filter 360 and a spectral filter 370 that are sequentially disposed between the beam splitter 120D and the second image sensor 120B. The low pass filter 360 transmits a wavelength shorter than a specific wavelength, and may be, for example, a near infrared (NIR) filter. The spectral filter 370 classifies incident light by wavelength and may be referred to as a spectrum filter. A spectrum of the specific region of the subject 150 is recorded in the second image sensor 1206 while passing through the spectral filter 370. The spectrum recorded in the second image sensor 120B may be converted to an electrical signal by photoelectric conversion and transmitted to a display device.

In the second dual camera apparatus 200 of FIG. 2, the light source module 230 may be formed by including the light source 120C, the first lens 310, the pinhole 320, and the second lens 350 of the second optical guide module 120A of FIG. 3. Also, in the second dual camera apparatus 200 of FIG. 2, the second light guide module 220A may be formed by including the second lens 350, the low pass filter 360, and the spectral filter 370 of the second optical guide module 120A of FIG. 3.

Figure 4:
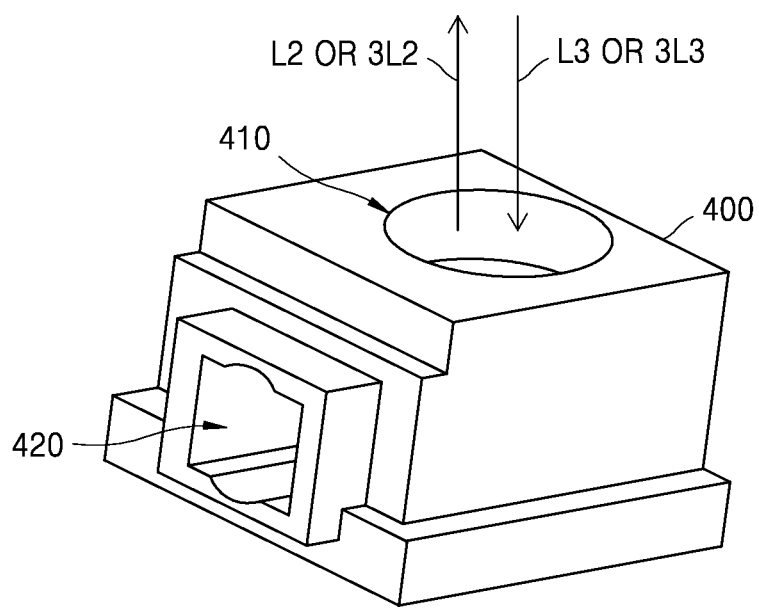
FIG. 4 is a perspective view of a case in which the second camera of FIG. 1 is mounted.

FIG. 4 shows a case 400 (or a housing) in which the second camera 120 described above is mounted. An opening 410 is a path through which light emitted from the second optical guide module 120A of the second camera 120 passes and is a path through which light reflected by the subject 150 is received. Power is supplied to a light source of a dual camera apparatus mounted on the case 400 through a side opening channel 420.

Figure 5:
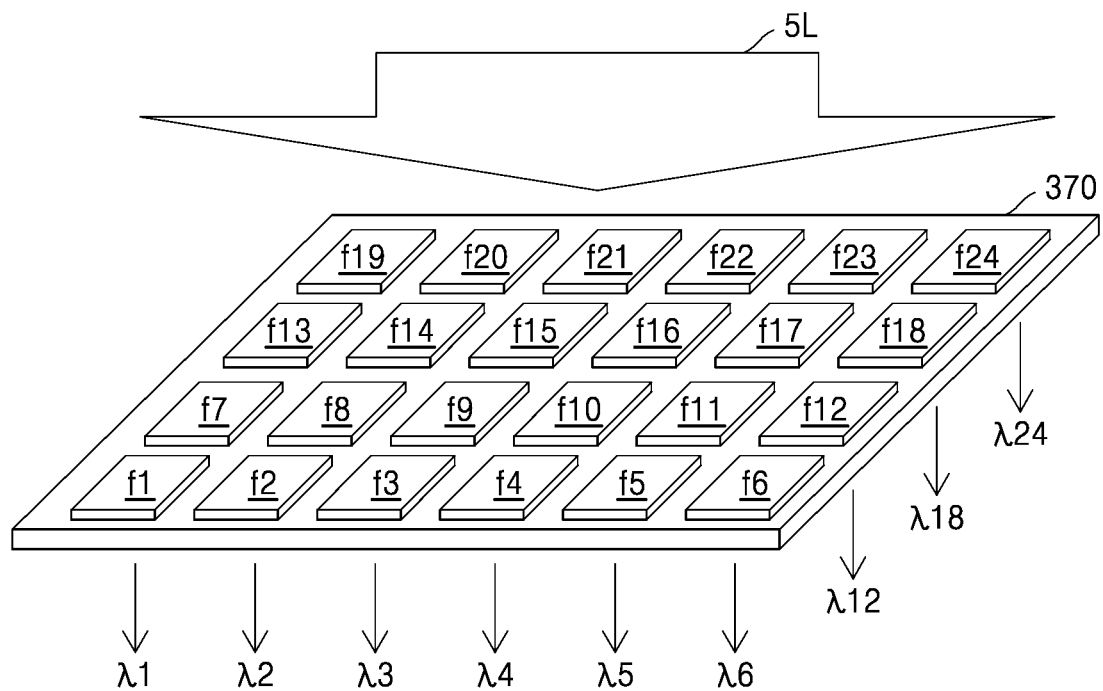
FIG. 5 is a perspective view of an example of the spectral filter of FIG. 3.

FIG. 5 shows an example of the spectral filter 370 of FIG. 3.

Referring to FIG. 5, the spectral filter 370 includes a plurality of filter regions f1 to f24. For convenience of explanation, the spectral filter 370 is depicted as including the first to twenty-fourth filter regions f1 to f24, but may include 24 or more filter regions. For example, the spectral filter 370 may include a filter area corresponding to the number of pixels of the second image sensor 120B. Light 5L incident on the spectral filter 370 through the beam splitter 120D includes a plurality of light components. In other words, the light 5L includes light of a plurality of wavelengths. For example, the light 5L is light reflected from the first area A1 of the subject 150 and may include various wavelength components of a visible light band. Each of the filter regions f1 to f24 of the spectral filter 370 has a layer structure that passes only light component having a specific wavelength. Light filtering characteristics of the first to twenty-fourth filter regions f1 to f24 included in the spectral filter 370 are different from each other. Therefore, the light 5L incident on the spectral filter 370 may form spectra_with light having 24 different wavelengths while passing through the spectral filter 370. For example, light of first to sixth wavelengths $\lambda 1$ to $\lambda 6$ is emitted through the first to sixth filter regions f1 to f6, and light of a twelfth wavelength $\lambda 12$, light of an eighteenth wavelength $\lambda 18$, and light of a twenty-fourth wavelength $\lambda 24$ respectively may be emitted through the twelfth filter region f12, through the eighteenth filter region f18, and through the twenty-fourth filter region f24. In this way, since the incident light 5L is divided into wavelengths by the spectral filter 370, the spectrum of the incident light 5L may be recorded in the second image sensor 120B. Since the incident light 5L is light reflected from the first area A1 of the subject 150, the second image sensor 1206 records the spectrum of the first area A1 of the subject 150.

Figure 6:
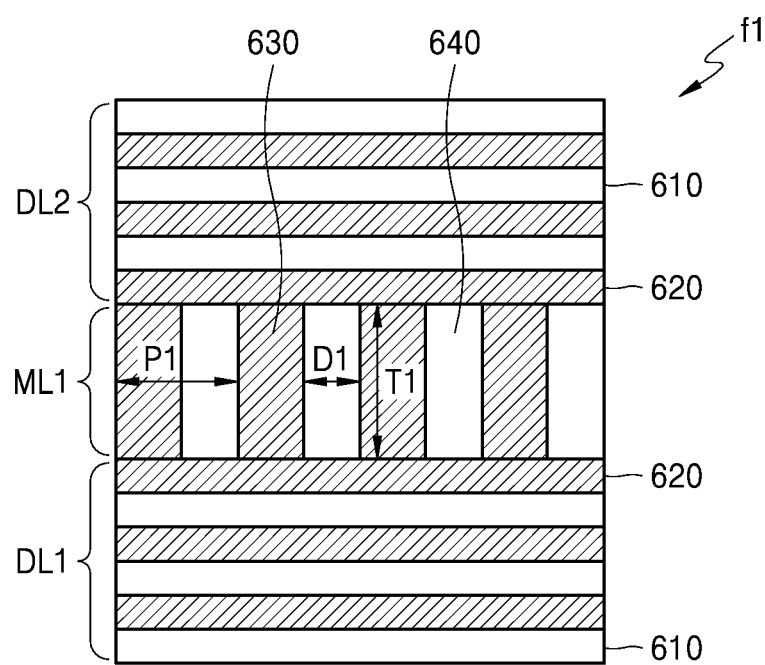
FIG. 6 is a cross-sectional view of a configuration of a filter region included in the spectral filter of FIG. 5.

FIG. 6 is a cross-sectional view of a configuration of one of the filter regions f1 to f24 (for example, the first filter region f1) included in the spectral filter 370 of FIG. 5.

Referring to FIG. 6, the first filter region f1 may include a first reflective layer DL1, a resonant layer ML1, and a second reflective layer DL2 that are sequentially stacked. The first reflective layer DL1, the resonant layer ML1, and the second reflective layer DL2 may form a resonance cavity. In the resonant layer ML1, a first material layer 630 and a second material layer 640 are horizontally and alternately arranged, and a resonance mode may be changed according to a pitch P1 of the first and second material layers 630 and 640 and a gap D1 of the first material layer 630. That is, the wavelength at which resonance occurs in the resonant layer ML1 may vary according to the pitch P1 of the first and second material layers 630 and 640 and/or the gap D1 of the first material layer 630. A thickness T1 of the resonant layer ML1 may also affect the resonance. Accordingly, a wavelength of light passing through the first filter region f1 may be changed by varying the pitch P1 of the first and second material layers 630 and 640 or the gap D1 of the first material layer 630, or the thickness T1 of the resonant layer ML1 or changing the combination thereof. Accordingly, parameters (pitch, gap, thickness) of the layer configuration of the resonant layers of the plurality of filter regions f1 to f24 included in the spectral filter 370 of FIG. 5 may be different from each other.

In FIG. 6, the first reflective layer DL1 may be a first distributed Bragg reflector (DBR) layer. For example, the first reflective layer DL1 includes a first layer 610 and a second layer 620 that have refractive indices different from each other and are sequentially stacked. The first and second layers 610 and 620 are alternately stacked three times. The number of alternating stacks of the first and second layers 610 and 620 may be three or more times or less. The first layer 610 may be, for example, a SiO$_2$ layer or may include a SiO₂ layer. The second layer 620 may be, for example, a TiO₂ layer or may include a TiO₂ layer.

The second reflective layer DL2 may be a second DBR layer. For example, the second reflective layer DL2 may include the second layer 620 and the first layer 610 that have refractive indices different from each other and are sequentially stacked. The second layer 620 and the first layer 610 that are sequentially stacked are alternately stacked three times. The number of alternating stacks of the second layer 620 and the first layer 610 may be three or more times or less. Therefore, both the uppermost layer of the first reflective layer DL1 and the lowermost layer of the second reflective layer DL2 may be the second layer 620. The first material layer 630 of the resonant layer ML1 may include the same material as the second layer 620 of the first and second reflective layers DL1 and DL2. The second material layer 640 may include the same material as the first layer 610 of the first and second reflective layers DL1 and DL2.

Figure 7:
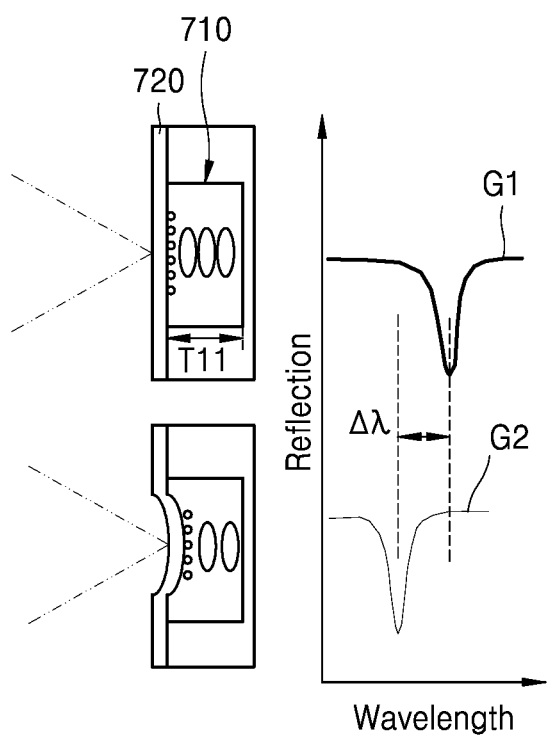
FIG. 7 is a cross-sectional view and a graph illustrating a change in light reflection characteristics according to a change in thickness of an optical cavity.

FIG. 7 shows a change in light reflection characteristics according to a change in thickness of an optical cavity 710.

Referring to FIG. 7, when a thickness T11 of the optical cavity 710 is reduced by applying pressure to a film 720 of the optical cavity 710, as shown in graphs G1 and G2 on a right side of the optical cavity 710, it may be seen that light reflection characteristics are changed. That is, when the thickness T11 of the optical cavity 710 is reduced, the light absorption wavelength is shifted to a left.

In this way, the light reflection characteristic is changed according to the thickness change of the optical cavity 710, which is appeared by a spectral change of reflected light. Therefore, the change of the optical cavity 710 may be seen by measuring a spectrum of light reflected by the optical cavity 710 by using a dual camera apparatus according to an embodiment. If there is reference spectral data with respect to the change of the optical cavity 710, an actual change of the optical cavity 710 may be found by comparing a spectral change observed for the optical cavity 710 with the reference spectral data, and thus, an appropriate action may be taken with respect to the change. For example, a certain material may be present in the optical cavity 710.

Figure 8:
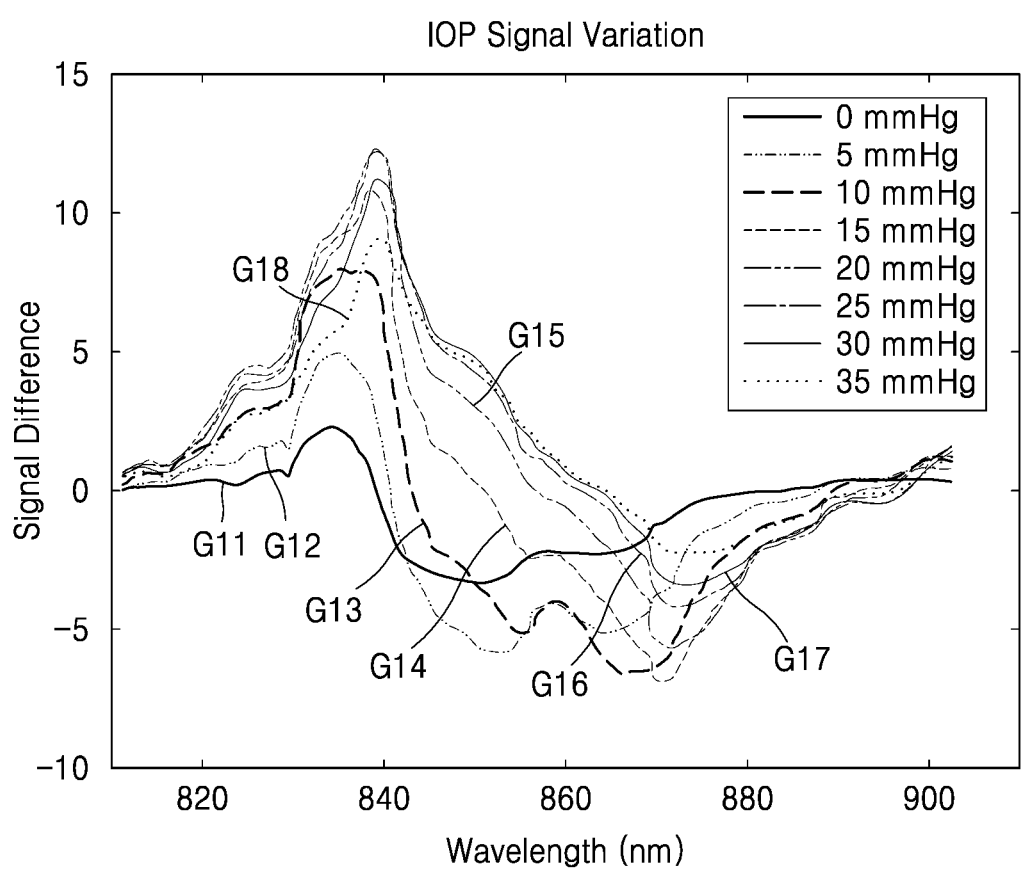
FIG. 8 is a graph showing a spectral change according to the change in intraocular pressure measured by irradiating light to an intraocular pressure sensor implanted in an eye.

FIG. 8 is a graph showing a spectral change according to the change in intraocular pressure measured by irradiating light to an intraocular pressure sensor implanted in an eye. The eye may correspond to the subject 150, and the intraocular pressure sensor may correspond to the first area A1 of the subject 150. After irradiating concentrated light to the intraocular pressure sensor by using the second camera 120 of the first dual camera apparatus 100 according to an embodiment, a spectrum may be measured by receiving light reflected from the intraocular pressure sensor.

In FIG. 8, the horizontal axis represents wavelength and the vertical axis represents signal difference, that is, spectral difference.

In FIG. 8, a first graph G11 represents a spectrum measured when pressure applied to the intraocular pressure sensor is 0 mmHg. Second to eighth graphs G12-G18 show spectrums measured when pressures applied to the intraocular pressure sensors are 5, 10, 15, 20, 25, 30 and 35 mmHg, respectively. The pressure applied to the intraocular pressure sensor denotes intraocular pressure.

Referring to FIG. 8, the first to eighth graphs G11 to G18 are different from each other, and none are the same. In other words, if the intraocular pressure applied to the intraocular pressure sensor is different, it may be seen that measured spectrums are all different. This fact indicates that the change in intraocular pressure may be seen through the spectrum measured from reflected light by irradiating light to the intraocular pressure sensor, and it indicates that the degree of intraocular pressure in the eye may be seen by comparing a measured spectrum with a prepared reference spectrum.

Figure 9:
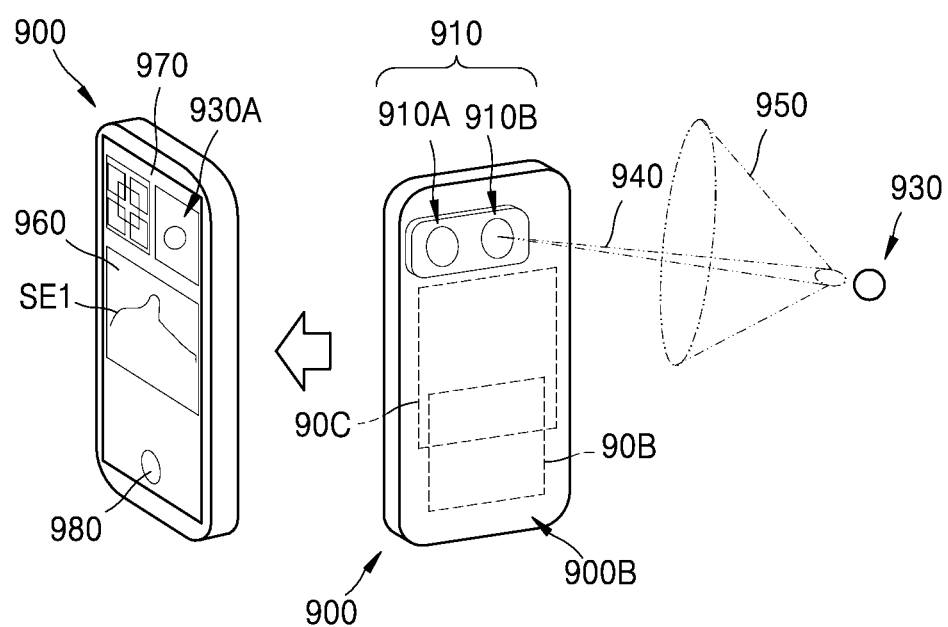
FIG. 9 is a perspective view of a mobile phone as one of an electronic apparatus including a dual camera apparatus according to an embodiment.

FIG. 9 is a perspective view of a mobile phone 900 as one of an electronic apparatus including a dual camera apparatus 910 according to an embodiment.

Referring to FIG. 9, the mobile phone 900 is equipped with the dual camera apparatus 910 on a rear surface 900B of the mobile phone 900. The dual camera apparatus 910 includes first and second cameras 910A and 910B. The first and second cameras 910A and 910B of the dual camera apparatus 910 are mounted to receive light 950 reflected by the subject 930. The first camera 910A may include the first camera 110 of FIG. 1. The second camera 910B may include the second camera 120 of FIG. 1. As a result, the dual camera apparatus 910 may correspond to the first dual camera apparatus 100 of FIG. 1. In the dual camera apparatus 910, for convenience, it is not depicted a light source corresponding to the first light source 130 of FIG. 1. Although not shown, a light source for the first camera 910A, which is a general camera, may be disposed on a left side of the first camera 910A or a right side of the second camera 910B, or between the first and second cameras 910A and 910B. Power required for operating of the dual camera module 910 may be supplied from a battery 90B built in the mobile phone 900. The mobile phone 900 includes a circuit unit 90C for operating and controlling the mobile phone 900, and operation and control of the dual camera apparatus 910 may also be performed through the circuit unit 90C. Reference numeral 940 denotes concentrated light irradiated onto the subject 930 by the second camera 910B for spectrum measurement. Light 950 reflected from the subject 930 may include natural light reflected from the subject 930, or light that light irradiated onto the subject 930 from a light source for the first camera 910A is reflected from the subject 930, or light that light irradiated onto a specific region of the subject 930 from the second camera 910B is reflected from the specific region of the subject 930.

According to an embodiment, the electronic device may include a processor and memory. The processor may be a computer processing unit (CPU), hardware processor or other circuitry.

Referring to the left diagram in FIG. 9, a front surface of the mobile phone 900 includes first and second display regions 960 and 970. The first and second display regions 960 and 970 may be physically divided regions, but may be regions divided by a program in the mobile phone 900. There is no physical boundary between the first and second display regions 960 and 970, and the physical boundary may not be visible. In the first display region 960, spectrum information SE1 of the specific area of the subject 930 obtained through the second camera 910B may be displayed. The spectrum information SE1 may include a spectrum. In the second display region 970, an image 930A of the subject 930 obtained through the first camera 910A may be displayed. Reference numeral 980 denotes a function button for performing a function, such as screen switching.

When the second camera 200 shown in FIG. 2 is mounted instead of the camera 910, the light source module 230 of FIG. 2 may be disposed between the first camera 910A and the second camera 910B.

Next, a method of operating a dual camera apparatus or an electronic apparatus including the dual camera apparatus will be described with reference to FIG. 10. The operation method may include measuring an image of a subject and a spectrum of a specific area of the subject by using the electronic apparatus. The electronic apparatus is regarded as the mobile phone shown in FIG. 9. Accordingly, FIG. 9 is also referred in the description of FIG. 10.

First, an image of the subject 930 is obtained by directing the first camera 910A toward a subject 930 including an object (S1). The subject 930 is the target for obtaining the spectrum information.

In (S2), a position of the subject 930 is confirmed by using the first camera 910A. After confirming a position of the subject 930 by using the first camera 910A, a specific part, a specific point, or a position of a specific region where a spectrum is to be measured in the subject 930 is confirmed. A material (for example, various compounds, biological materials, electronic materials, semiconductor materials, etc.) to be analyzed through a spectrum analysis, or a member implanted in the subject 930, such as an intraocular pressure sensor, or a member attached to the subject 930, such as a contact lens may exist at the specific part, the specific point, or the specific region. In the latter case, the subject 930 may be a human eye.

Next, a spectrum of the specific region or the specific point of the subject 930, or the specific object mounted on or provided thereto may be measured by using the second camera 910B (S3).

During the measurement, images of the subject 930 may be continuously photographed by using the first camera 910A. The images of the subject 930 and the measured spectrum are displayed on a display region of the mobile phone 900 (S4). That is, the spectrum measured in the third operation S3 may be displayed on the first display region 960 of the mobile phone 900, and the images of the subject 930 may be displayed on the second display region 970 of the mobile phone 900. The images of the subject 930 and the spectrum to be measured may be simultaneously displayed in real time. The mobile phone 900 may be an example of a display device.

The process of measuring a spectrum by using the second camera 9106 is described more in detail. Concentrated light is irradiated onto a specific part, a spectrum of which is to be obtained or a specific object, a spectrum of which is to be obtained by using the second camera 910B.

Light irradiated onto a specific part of the subject 930 or a specific object mounted on the subject 930 is reflected from the specific part or the specific object, and the reflected light is incident on the second camera 910B. The reflected light incident on the second camera 910B is incident on an image sensor through a spectral filter. A spectrum of the reflected light appears as it passes through the spectral filter, and the spectrum is recorded in the image sensor. The spectrum recorded in the image sensor may be displayed on the first display region 960 of the mobile phone 900 through image conversion and processing in the mobile phone 900.

The spectrum measured in this way is compared with a standard or reference spectrum prepared in advance with respect to the specific region of the subject 930 or the specific object provided in the specific region (S5).

According to an example embodiment, through the comparison process, it is possible to detect the change and the degree of change (e.g., intraocular pressure change and the degree of change of the intraocular pressure) of the specific region or the specific object, and prepare an action corresponding to the change. As a result of the spectrum measurement, when the change in the intraocular pressure is out of a normal value, it may be notified to a medical institution or a medical worker to receive an appropriate treatment. That is, the result of the comparison of the fifth operation S5 may be notified to a person who may take an appropriate measure (S6). The process of notifying the measurement result may be made in real time or quickly using the mobile phone 900. For this purpose, a program supporting this process may be provided in the mobile phone 900.

The disclosed dual camera apparatus is a small camera in which a general camera and a spectrum camera are combined. Accordingly, the disclosed dual camera apparatus may be mounted on a small mobile device (e.g., a mobile phone), and by using such a mobile device, it is also possible to measure high-resolution spectrum information (spectrum) with respect to a specific region of the subject or a sensor (e.g., an intraocular pressure sensor) provided in a specific region of the subject while measuring the image of the subject.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A dual camera apparatus comprising:
   a first camera configured to obtain a first image including a first area of a subject, the first image being an outside image of the subject; and
   a second camera different than the first camera, wherein the second camera comprises:
      a first light source;
      an optical element configured to concentrate light emitted from the first light source onto a second area within the first area of the subject, the second area being smaller than the first area; and
      an image sensor configured to obtain spectrum information with respect to the second area within the first area of the subject.

2. The dual camera apparatus of claim 1, wherein the second camera comprises a case in which the light source and the optical element are built-in.

3. The dual camera apparatus of claim 1, wherein a second light source is provided outside the first and second camera.

4. The dual camera apparatus of claim 1, wherein the second camera comprises a camera element configured to obtain a spectrum with respect to the second area within the first area of the subject.

5. The dual camera apparatus of claim 1, wherein the optical element comprises an optical guide element configured to radiate concentrated light emitted from the first light source to the second area within the first area of the subject and transferring light reflected from the second area within the first area of the subject to the image sensor.

6. The dual camera apparatus of claim 5, wherein the optical guide element comprises:
   a beam splitter on-axially disposed with the first light source;
   a first optical unit disposed between the first light source and one surface of the beam splitter to supply linearly polarized light to the beam splitter;
   a second optical unit that is disposed in a direction of emitting the linearly polarized light supplied to the beam splitter from the beam splitter to give a change to the linearly polarized light, and comprises a configuration by which the linearly polarized light that is changed is concentrated on the second area within the first area of the subject;
a spectrum filter disposed between the beam splitter and the image sensor; and
a low pass filter disposed between the beam splitter and the spectrum filter.

7. The dual camera apparatus of claim 6, wherein the first optical unit comprises:
a pinhole disposed between the first light source and the beam splitter;
a collimation lens disposed between the pinhole and the first light source; and
a linear polarizer disposed between the pinhole and the beam splitter.

8. The dual camera apparatus of claim 6, wherein the second optical unit comprises:
a phase delay plate for changing a polarization direction of the linearly polarized light emitted from the beam splitter; and
a second lens for concentrating light incident through the phase delay plate to the second area within the first area of the subject.

9. The dual camera apparatus of claim 6, wherein the spectrum filter comprises a plurality of filter regions, wherein
each of the plurality of filter regions comprises a layer structure that transmits light of different wavelengths from each other.

10. An electronic apparatus comprising:
the dual camera apparatus of claim 1; a display region in which a plurality of pieces of information transmitted from the dual camera apparatus are simultaneously displayed;
a circuit configured to drive and control the electronic apparatus; and
a battery.

11. The electronic apparatus of claim 10, wherein the plurality of pieces of information comprise the first image including the first area of the subject and spectrum information about the second area within the first area of the subject.

12. The dual camera apparatus of claim 1, wherein the first image including the first area of the subject and the spectrum information with respect to the second area within the first area of the subject are obtained simultaneously.

13. A dual camera apparatus comprising:
a first camera provided to obtain a first image including a first area of a subject, the first image being an outside image of the subject;
a second camera provided to obtain a spectral image of a second area within the first area of the subject; and
a light source module configured to emit concentrated light on the second area within the first area of the subject, wherein the light source module is disposed around the first camera and second camera,
wherein the light source module comprises:
a light source;
a collimation lens configured to convert light emitted from the light source into parallel light;
a pinhole configured to remove unnecessary light from the light passing through the collimation lens; and
a lens configured to concentrate light passing through the pinhole on the second area within the first area of the subject.

14. The dual camera apparatus of claim 13, wherein the light source module is disposed between the first camera and the second camera.

15. An electronic apparatus comprising:
the dual camera apparatus of claim 13;
a display region in which a plurality of pieces of information transmitted from the dual camera apparatus are simultaneously displayed;
a circuit configured to drive and control the electronic apparatus; and
a battery.

16. A method of operating an electronic apparatus including a dual camera apparatus, the method comprising:
acquiring an image of a subject using a first camera; and
acquiring a spectrum of a portion of a region of the subject by using a second camera, the second camera being different than the first camera, wherein
the acquiring of the spectrum comprises:
irradiating light to the portion of the region of the subject by using an exclusive light source built in the second camera; and
simultaneously displaying the acquired image and the spectrum,
wherein the dual camera apparatus includes the first and second cameras.

17. The method of claim 16, further comprising comparing the acquired spectrum with a reference spectrum.

18. The method of claim 17, further comprising notifying a user of a comparison result obtained in the comparing operation.

19. The method of claim 16, wherein the acquiring of the spectrum comprises:
confirming the portion of the region of the subject with the first camera;
converting light emitted from the exclusive light source into polarized light;
irradiating the polarized light to the portion of the region of the subject by concentrating the polarized light;
changing a polarization state of light reflected by the portion of the region of the subject; and
recording the light, the polarization state of which is changed, into an image sensor by dividing the light by wavelengths.

20. The method of claim 16, wherein the portion of the region of the subject is a partial region of an intraocular pressure sensor implanted in a human eye or a partial region of a contact lens attached to a human eye.

* * * * *